United States Patent [19]

Yokoi et al.

[11] Patent Number: 4,686,359
[45] Date of Patent: Aug. 11, 1987

[54] PICTURE SCANNING AND RECORDING USING A PHOTOELECTRIC FOCUSING SYSTEM

[75] Inventors: Masakatsu Yokoi, Kyoto; Tsutomu Harada, Shiga, both of Japan

[73] Assignee: Dainippon Screen Mfg. Co., Ltd., Kyoto, Japan

[21] Appl. No.: 688,457

[22] Filed: Jan. 2, 1985

[30] Foreign Application Priority Data

Jan. 10, 1984 [JP] Japan .................. 59-1258

[51] Int. Cl.$^4$ .................. G01J 1/20; H04N 1/028
[52] U.S. Cl. .................. 250/201; 358/292
[58] Field of Search .................. 250/201, 203 R, 204, 250/206, 559, 208, 209, 234, 201 DF, 201 AF, 201 AP; 358/227, 285, 292–293; 369/45; 354/403

[56] References Cited

U.S. PATENT DOCUMENTS

| 4,003,655 | 1/1977 | Wasilko | 250/203 S X |
| 4,079,248 | 3/1978 | Lehureau | 250/201 DF |
| 4,230,940 | 10/1980 | Minami et al. | 250/201 |
| 4,276,471 | 6/1981 | Utagawa | 250/201 AF |
| 4,447,717 | 5/1984 | Nohda | 250/201 |
| 4,618,762 | 10/1986 | Hattori et al. | 250/201 |

Primary Examiner—Eugene R. LaRoche
Assistant Examiner—David Mis
Attorney, Agent, or Firm—Hayes, Davis & Soloway

[57] ABSTRACT

A picture scanning and recording method in obtaining picture signals by photoelectrically scanning sequentially an original picture applied onto an original picture drum by a scanning head moving in the axial direction of the original picture drum, wherein the scanning head is maintained onto a focus-matching position on the surface of an original picture film by minutely moving said scanning head in the direction intersecting at right angles with a scanning light point on the original picture drum according to variation of substantial distance between the film surface of the original picture and a pick-up lens of the scanning head.

1 Claim, 3 Drawing Figures

PICTURE SCANNING AND RECORDING USING A PHOTOELECTRIC FOCUSING SYSTEM

BACKGROUND OF THE INVENTION

The present invention relates to a picture scanning and recording method for maintaining a scanning head or a recording head at a focus matching position relative to the film surface applied onto an original picture drum or relative to the surface of a photoelectrical material applied to a recording drum by controlling the position of the scanning head or the recording head in a picture scanning and recording apparatus such as a color scanner etc.

In the present method there are two cases and they are identical with each other, essentially. One of the cases is to apply the present method of the scanning side of the picture scanning and recording apparatus and the other is to apply it to the recording side. However, the former case is more complicate than the latter case, so that hereinafter we will explain the former case, i.e., the more complicate case.

For example, in a color scanner of rotary drum type, positional relation between the original picture applied onto the scanning drum and a pick-up lens of the scanning head must be focus-matched relation.

However, practically, quality of material of the original picture film and thickness thereof are somewhat different from each other by those different makers thereof, accordingly, prior to carrying out scanning, manually controlling an adjusting screw by an operator is required so that the pick-up lens may be moved a minute distance in the front or rear direction relative to the original picture drum to scan the original picture so that it is in focus.

However, such adjustment is time-consuming work for the persons not proficient in the art and even for the operator it is hard to precisely adjust it, and quality of final printings is liable to be deteriorated.

In addition, the shape of the drum on which the original picture is applied, particularly, because of manufacturing precision of the size of the outside diameter of the drum, the drum size is not strictly constant with respect to its axial direction, so that, even if the operator focuses the lens, when the original picture is photoelectrically scanned, slipping off focusing point is liable to occur.

SUMMARY OF THE INVENTION

Therefore, it is an object of the present invention to provide a picture scanning and recording method for correcting the position of a scanning head of a picture scanning and recording apparatus with respect to a scanned light point on an original picture drum by easily detecting slipping off of a pick-up lens from its focusing point. Hereinafter, the present invention will be described in detail with respect to a preferred embodiment referring to the accompanying drawings.

DESCRIPTION OF A PREFERRED EMBODIMENT

Figure 1:
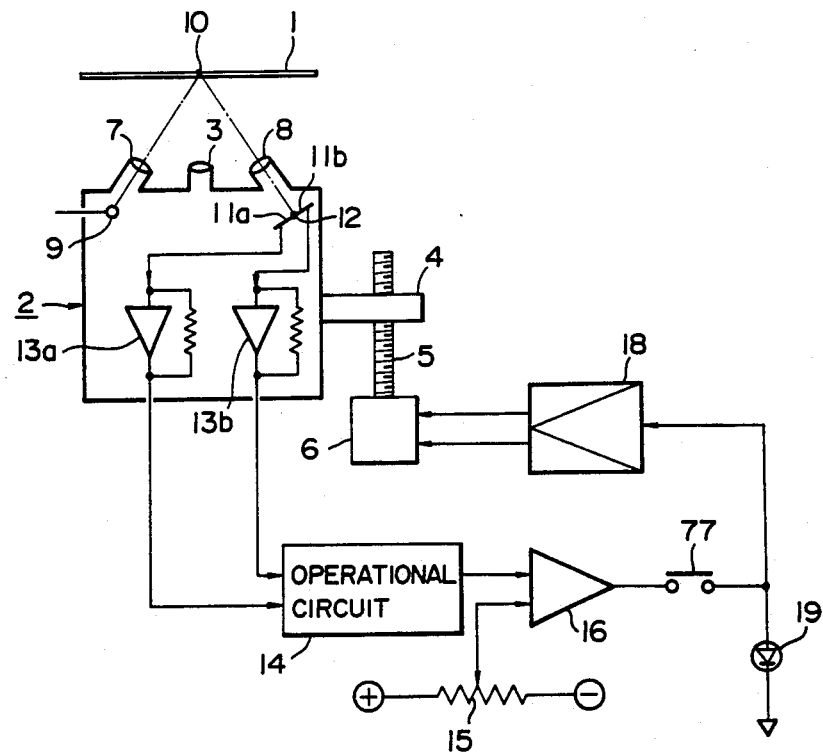
FIG. 1 is a view showing a circuit for practicing the method of the present invention.

In FIG. 1, the reference number 1 designates an original picture applied onto an original picture drum (not shown) used generally in the picture scanning and recording apparatus, the reference number 2 designates a scanning head and 3 indicates a pick-up lens.

The scanning head 2 is adapted to be driven in the direction parallel to an axial direction of a drum (right and left directions in FIG. 1) by a known feeding means (not shown) which feeds the scanning head 2 in the sub-scanning direction (right and left direction in FIG. 1), and to a supporting arm 4 projecting from one side of the scanning head 2, a threaded rod 5 disposed in the direction perpendicular to the axial direction of the original picture drum is screwed. The threaded rod 5 is rotated by a servo-motor 6.

Accordingly, the scanning head 2 is constructed, same as those of the conventional ones, so as to be able to move in the sub-scanning direction and also able to move minute distance in the direction intersecting at right angles with the axial line of the original picture drum so that the method according to the present invention may be practised.

Figure 2:
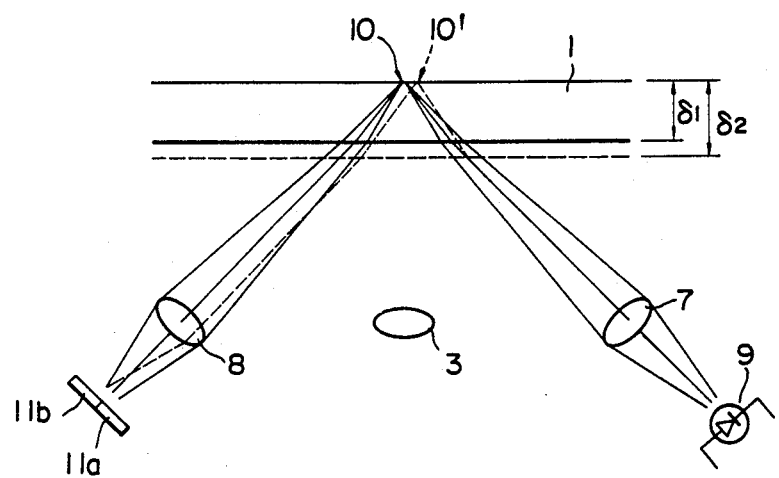
FIG. 2 is a plan sketch showing an optical part for illustrating the operational principle of the present invention.

As shown in FIGS. 1 and 2, in each of right and left sides of a pick-up lens 3 mounted on the scanning head 2, there are provided a light projecting means and a light receiving means respectively, each of which optical axes intersect with each other on the original picture 1.

In the rear of a light projecting lens 7 in the light projecting means, for example, there is provided a light point source 9 comprising such as a laser diode or luminescent diode etc. which is adapted to focus a micro light point 10 on the film surface of the original picture 1.

In the rear of a light receiving lens 8 in the light receiving means, for example, there is provided a light sensor 11 comprising two divided regions 11a and 11b oppositely disposed so as to produce a somewhat dimmed image 12.

The above fact is, for the reason that, as will be described hereinafter, patterns on the original picture 1 does not effect output signals output from those divided region 11a and 11b. However, in the case of being applied at the recording side, no such consideration is necessary.

Further, with each of the divided regions 11a and 11b current-voltage converting amplifiers 13a and 13b mounted in the inside of the scanning head 2 are connected, respectively.

Figure 3:
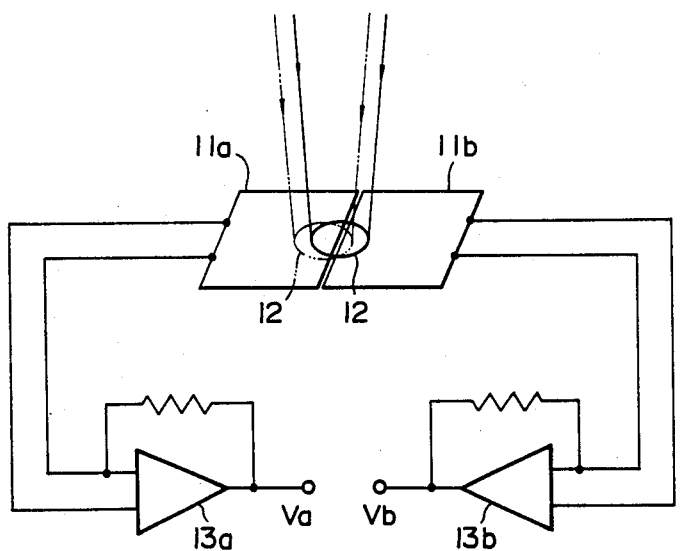
FIG. 3 is an enlarged perspective view of a light receiving part of the circuit shown in FIG. 1.

These amplifiers are adapted so that when the pick-up lens 3 of the scanning head 2 is scanning the original picture 1 in focused state, i.e., when thickness of a base film is $\delta_1$, as shown in a solid line in FIG. 2 and the light point 10 is in the reference position (in FIG. 2 it is on the optical axis), an image 12 of the light point 12 is focussed on an equilibrium position as shown by a solid line in FIG. 3, that is, mounting equally on each of the divided regions 11a and 11b of the light sensor 11.

Accordingly, at this time outputs Va and Vb of both current-voltage converting amplifiers 13a and 13b become equal to each other independent on reflecting light quantity P of the ligth point 10.

However, in a case in which thickness of the base film of the original picture 1 is not changed, but the material thereof is changed, or on the contrary in other case in which the material is not changed but changes in thickness etc., for example, if thickness of the base film changes, as shown by a dotted line in FIG. 2, from $\delta_1$ to $\delta_2$, the light point 10 on the film surface of the original picture 1 displaces slightly to a position 10' shown in FIG. 2, so that the image 12 of the light point 10 on the light sensor displaces slightly, as shown by two-dotted line in FIG. 3, for example, so as to expose the divided region 11b of the light sensor 11 more intensely.

Assuming that the whole amount of received light at this time on the divided regions 11a and 11b of the light sensor 11 is p, $100 \times \%$ of the whole amount of received light is received on the region 11a and the remaining $100(1-X)\%$ thereof is received on the region 11b, and the difference between those two outputs Va and Vb is represented by the following formula; that is, $Va - Vb = Px - P(1-x) = P(2x-1)$. Thus, the value of the above formula is proportion to the whole amount of received light P.

The whole amount of received light P differs according to each of the picture pattern areas of the original picture, so that if the difference between the both outputs Va and Vb is directly utilized for focusing the lens, exact focusing control can not be achieved influenced by magnitude of the whole amount of received light P.

$$\frac{Va - Vb}{Va + Vb} = \frac{\rho(2x-1)}{\rho} = 2x - 1$$

Therefore, in the present invention, as shown in the following formula, by utilizing the ratio of the sum of the both outputs Va and Vb to the difference therebetween, the pick-up lens 3 can be exactly focussed independently of the whole amount of received light.

In addition, the value of x, that is, the position of an optical axis of a reflected light beam from the original picture on the light sensor 11 varies in proportion to change of thickness of the base film of the original picture, and the focus-matched position (the position on which the lens focuses) of the pick-up lens 3 varies in proportion to value of $$\frac{Va - Vb}{Va + Vb}.$$

Accordingly, by comparing value of $$m \cdot \frac{Va - Vb}{Va + Vb}$$

(m is constant) with that of reference voltage, and relatively moving minute distance the scanning head 2 to the original picture so as to make the difference zero, the pick-up lens 3 is positioned on the focusing position to the film surface of the original picture 1.

An operational circuit 14 in FIG. 1 is connected with the current-voltage converting amplifiers 13a and 13b, and from outputs Va and Vb thereof the above described value $$m \cdot \frac{Va - Vb}{Va + Vb}$$

is calculated. The output is input to a differential amplifier 16 together with output voltage of a reference voltage setting means 15, and the differetial voltage thereof is amplified.

Further, an output of the differential amplifier 16 is input to a servo amplifier 18 through a pushing button switch 77, and by the outut thereof the servo-motor 6 is rotatively controlled so that the output of the operational circuit 14 may cause the scanning head 2 to displace relative to the output of the reference voltage setting means 15. Thus distance between the original picture 1 and the pick-up lens 3 of the scanning head 2 is controlled so as to become a predetermined value.

The reference number 19 shown in FIG. 1 is a detection indicating lamp comprised of a luminescent diode etc., and when the focussing position of the pick-up lens 3 of the scanning head 2 is determined, that is, when output of the differential amplifier 16 becomes zero, the detection indicating lamp 19 and the light point source 9 are turned off to let the operator know that he may switch off the push button switch 77.

Operation for positioning the pick-up lens 3 of the scanning head 2 to the focussing point continues during the original picture 1 being scanned, if the operator does not switch off the push button. For example, even if the outside diameter of the original picture drum varies in the axial direction thereof, the focusing point of the pick-up lens 3 to the film surface of the original picture 1 can be maintained.

As described above, according to the present invention, the amount of reflected light of the light point 10 can determine the distance between the original picture 1 and the pick-up lens 3 automatically, having nothing to do with light and shade of the original picture 1, by simple operation of the push button switch 17.

In the above description regarding slightly dimmed image 12 of the light point 10 only brief description is given, however, hereinafter we will give further detailed description. Because of there being light and shade patterns on the original picture 1, if the image 12 of the light point 10 is too sharp, images thereof are focused on both light sensers 11a and 11b by which there may be apprehension that outputs of them are not proportion to light receiving areas thereof. With the same reason it is desired that the light point 10 is relatively minute.

In the above description, for detecting position of the image 12 on a light sensor of the light point 10, those two divided light sensors 11a and 11b are used, of course, quartered light sensors also can be utilized, and in addition, semiconductor light position detectors such as CCD etc. may be used.

The method according to the present invention can be applied, as described above, easily to the recording side. Even if applied as such, it is quite identical in essence with the above mentioned case, so that further detailed explanations are not added.

While the described embodiment represents the preferred form of the present invention, is is to be understood that modifications will occur to those skilled in that art without departing from the spirit of the invention. The scope of the invention is therefore to be determined solely by by the appended claims.

What is claimed is:

1. A system for maintaining a scanning head in a focused position on the surface of an original picture film applied to an original picture drum wherein picture signals are obtained by photoelectrically scanning said original picture film with said scanning head moving in the axial direction of said original picture drum, said system comprising:
  (a) pickup means mounted on said scanning head for scanning said original picture film;
  (b) light projection means, having a light projection lens and a light point source at the rear of said light projection lens, disposed on one side of said pickup means for focusing a light point on the surface of said original picture film, said light projection means having an optical axis thereof intersecting, on said original picture film, with an optical axis of a light receiving means;
  (c) light receiving means disposed on the other side of said pickup means for producing an image of said light point, and comprising a light receiving lens and a light sensor composed of a plurality of divided regions;
  (d) operational means for calculating an output signal from said divided regions;
  (e) comparing means for comparing the output signal from said operational means with a reference signal and producing a signal representing a difference therebetween; and
  (f) displacing means for minutely displacing said scanning head in a direction at right angles with the axial direction of said original picture drum until said signal representing a difference is zero.

* * * * *